(12) United States Patent
Freeman

(10) Patent No.: US 9,963,979 B2
(45) Date of Patent: May 8, 2018

(54) COMPOSITE COMPONENTS FOR GAS TURBINE ENGINES

(71) Applicant: Rolls-Royce North American Technologies, Inc., Indianapolis, IN (US)

(72) Inventor: Ted J. Freeman, Danville, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 521 days.

(21) Appl. No.: 14/869,580

(22) Filed: Sep. 29, 2015

(65) Prior Publication Data

US 2016/0138406 A1    May 19, 2016

Related U.S. Application Data

(60) Provisional application No. 62/080,776, filed on Nov. 17, 2014.

(51) Int. Cl.
| | | |
|---|---|---|
| *F01D 5/28* | (2006.01) | |
| *F01D 5/02* | (2006.01) | |
| *F01D 5/30* | (2006.01) | |

(52) U.S. Cl.
CPC .......... *F01D 5/284* (2013.01); *F01D 5/02* (2013.01); *F01D 5/282* (2013.01); *F01D 5/3007* (2013.01); *F01D 5/3053* (2013.01); *F01D 5/3084* (2013.01); *F05D 2220/32* (2013.01); *F05D 2230/60* (2013.01); *F05D 2230/64* (2013.01); *F05D 2240/24* (2013.01); *F05D 2240/30* (2013.01); *F05D 2260/30* (2013.01); *F05D 2300/2261* (2013.01); *F05D 2300/6033* (2013.01); *Y02T 50/672* (2013.01); *Y02T 50/673* (2013.01)

(58) Field of Classification Search
CPC . F01D 5/284; F01D 5/02; F01D 5/282; F01D 5/3007; F01D 5/3053; F01D 5/3084; F05D 2230/64; F05D 2260/30; F05D 2300/2261; F05D 2300/6033
See application file for complete search history.

(56) References Cited

U.S. PATENT DOCUMENTS

| | | |
|---|---|---|
| 2,821,357 A | 1/1958 | Schorner |
| 5,049,036 A | 9/1991 | Bailey et al. |
| 5,292,231 A | 3/1994 | Lauzeille |
| 5,368,444 A | 11/1994 | Anderson |
| 6,676,373 B2 | 1/2004 | Marlin et al. |
| 8,206,118 B2 | 6/2012 | Propheter-Hinckley et al. |

(Continued)

FOREIGN PATENT DOCUMENTS

| | | |
|---|---|---|
| EP | 0709547 A1 | 5/1996 |
| FR | 2995004 A1 | 3/2014 |
| JP | S5783607 A | 5/1982 |

OTHER PUBLICATIONS

Extended European Search Report, European Application No. 15188855.9-1610, dated Apr. 8, 2016, 10 pages.

*Primary Examiner* — Logan Kraft
*Assistant Examiner* — Peter T Hrubiec
(74) *Attorney, Agent, or Firm* — Barnes & Thornburg LLP

(57) ABSTRACT

A turbine wheel for use in a gas turbine engine having a plurality of blades attached to a rotor disk. Each blade is formed as a composite structure including a number of plies of ceramic-containing material. The blades each include a root to fit within dovetail slots of the rotor disk to couple the blades to the rotor disk.

18 Claims, 2 Drawing Sheets

(56) References Cited

U.S. PATENT DOCUMENTS

| | | |
|---|---|---|
| 2005/0260078 A1 | 11/2005 | Potter et al. |
| 2007/0048142 A1 | 3/2007 | Dambrine et al. |
| 2013/0011271 A1 | 1/2013 | Shi et al. |
| 2014/0119939 A1 | 5/2014 | Gallet |

COMPOSITE COMPONENTS FOR GAS TURBINE ENGINES

CROSS REFERENCE TO RELATED APPLICATIONS

This application claims priority to and the benefit of U.S. Provisional Patent Application No. 62/080,776, filed 17 Nov. 2014, the disclosure of which is now expressly incorporated herein by reference.

FIELD OF THE DISCLOSURE

The present disclosure relates generally to gas turbine engines, and more specifically to composite blade attachment.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include blades made from ceramic-matrix composite materials that are able to interact with the hot combustion products. In some turbine wheels, the blades may be coupled to a metallic disk that supports the blades in a gas path leading out of the combustor. Coupling of the blades made from ceramic-matrix composite materials with metallic disks can present design challenges.

SUMMARY

The present disclosure may comprise one or more of the following features and combinations thereof.

According to the present disclosure, a turbine wheel for a gas turbine engine is taught. The turbine wheel may include a disk and a blade. The disk may be formed to include a dovetail slot that extends through the disk in an axial direction from a forward side to an aft side of the disk and inwardly in a radial direction from an outer diameter of the disk toward a central axis. The blade may comprise ceramic-containing materials and may be formed to include an airfoil that extends outwardly in the radial direction from the outer diameter of the disk and a root that extends into the dovetail slot.

In some embodiments, the root may include a stem that extends from the airfoil into the dovetail slot and a pair of pin receivers arranged in the dovetail slot that extend circumferentially from the stem in opposing directions. The turbine wheel may include a pair of retention pins each arranged in the pin receivers. The pair of retention pins may be arranged on circumferentially opposed sides of the stem and may be arranged radially between the pin receivers and the disc so that centrifugal forces applied to the blade when the turbine wheel is rotated about the central axis are transferred through the pair of retention pins to the disk.

In some embodiments, each pin receiver may define a pin-receiving channel sized to receive one of the pair of retention pins and arranged to open outwardly in the radial direction. Each retention pin may be cylindrical. Each pin-receiving channel may be arcuate and may have substantially the same diameter as the retention pins.

In some embodiments, each retention pin may be at least partially non-cylindrical. Each retention pin may include a portion for engaging the pin-receiving channel and a portion for engaging the disc.

In some embodiments, the blade may include a first and a second composite ply. Each of the first and the second composite plies may include a stem portion that extends inwardly in the radial direction from the airfoil to provide at least part of the stem and a receiver portion that extends circumferentially away from the stem portion to provide at least part of a pin receiver.

In some embodiments, each of the first and the second composite plies may include an airfoil portion. The airfoil portion may extend radially outwardly from the root to provide at least part of the airfoil.

In some embodiments, the blade may be formed to include a platform arranged radially outward of the dovetail slot that extends circumferentially in both directions away from the airfoil. The blade may include a third and a fourth composite ply. Each of the third and the fourth plies may include a platform portion that extends circumferentially from the airfoil to provide at least part of the platform, a stem portion that extends inwardly in the radial direction from the platform to provide at least part of the stem, and a receiver portion that extends circumferentially away from the stem portion to provide at least part of a pin receiver.

In some embodiments, the blade may comprise ceramic reinforcements suspended in a ceramic-matrix material. The ceramic reinforcement may include silicon-carbide and the ceramic-matrix material may include silicon-carbide.

According to another aspect of the present disclosure, a composite blade for a gas turbine engine is taught. The composite blade may include an airfoil comprising ceramic-matrix material and a root comprising ceramic-matrix material.

In some embodiments, the root may include a stem that extends from the airfoil and a pair of pin receivers that extend in two generally opposed directions from the stem. The pin receivers may define pin-receiving channels on opposed sides of the stem that open to face toward the airfoil.

In some embodiments, each pin-receiving channel may be arcuate. In some embodiments, the blade may include a first and a second composite ply. Each of the first and the second composite plies may include a stem portion that extends from the airfoil to provide at least part of the stem and a receiver portion that extends away from the stem portion to provide at least part of a pin receiver.

In some embodiments, each of the first and the second composite plies may include an airfoil portion. The airfoil portion may extend from the root to provide at least part of the airfoil.

In some embodiments, the blade may be formed to include a platform arranged between the pair of pin retainers and the airfoil. The platform may extend in two generally opposed directions away from the airfoil.

In some embodiments, the blade may include a third and a fourth composite ply. Each of the third and the fourth plies may include a platform portion that extends in two generally opposed directions from the airfoil to provide at least part of the platform, a stem portion that extends from the platform portion to provide at least part of the stem, and a receiver portion that extends from the stem portion to provide at least part of a pin receiver.

In some embodiments, the blade may include ceramic reinforcements suspended in the ceramic-matrix material. In some embodiments, the blade may include a first ply of ceramic reinforcements coupled to a second ply of ceramic reinforcements, a third ply of ceramic reinforcements coupled to the first ply, and a fourth ply of ceramic reinforcements coupled to the second ply. The first, second, third, and fourth plies may be bonded together with the ceramic-matrix material to form a composite structure. The composite structure may have an airfoil portion formed by the first and second plies, a platform portion formed by the third and fourth plies, a stem portion formed by the first, second, third, and fourth plies, a first pin receiver portion formed by the first and third plies, and a second pin receiver portion formed by the second and fourth plies.

In some embodiments, the blade may include a plurality of segmented ceramic reinforcements suspended in a ceramic-matrix material. The segmented ceramic reinforcements and ceramic-matrix material may be positioned between the pin receivers and adapted to support lateral loading of the pin receivers.

According to another aspect of the present disclosure, a method of assembling a turbine wheel is taught. The method may include positioning a root of a composite blade in a dovetail slot of a rotor disk. The root may include a stem that extends from an airfoil of composite blade and a pair of pin receivers that extend in two generally opposed directions from the stem and that define pin-receiving channels on opposed sides of the stem that open to face toward the airfoil.

In some embodiments, the method may include positioning a retention pin in each pin-receiving channel such that the pins contact the pin-receiving channel and the dovetail slot of the rotor disk. The retention pin may maintain positioning of the root within the dovetail slot.

In some embodiments, the method may include securing the root within the dovetail slot. Securing the root within the dovetail slot may include forcing the pin receivers against the dovetail slot with the retention pins and forcing the retention pins toward one another such that the pin receivers and the stem are in compression. In some embodiments, securing the root within the dovetail slot may include securing a cover plate to the rotor disk at a forward end of the dovetail slot and securing a cover plate to the rotor disk at an aft end of the dovetail slot such that the cover plates block the root and retention pins from passing out of the dovetail slot through the forward or aft ends.

These and other features of the present disclosure will become more apparent from the following description of the illustrative embodiments.

DETAILED DESCRIPTION OF THE DRAWINGS

Figure 1:
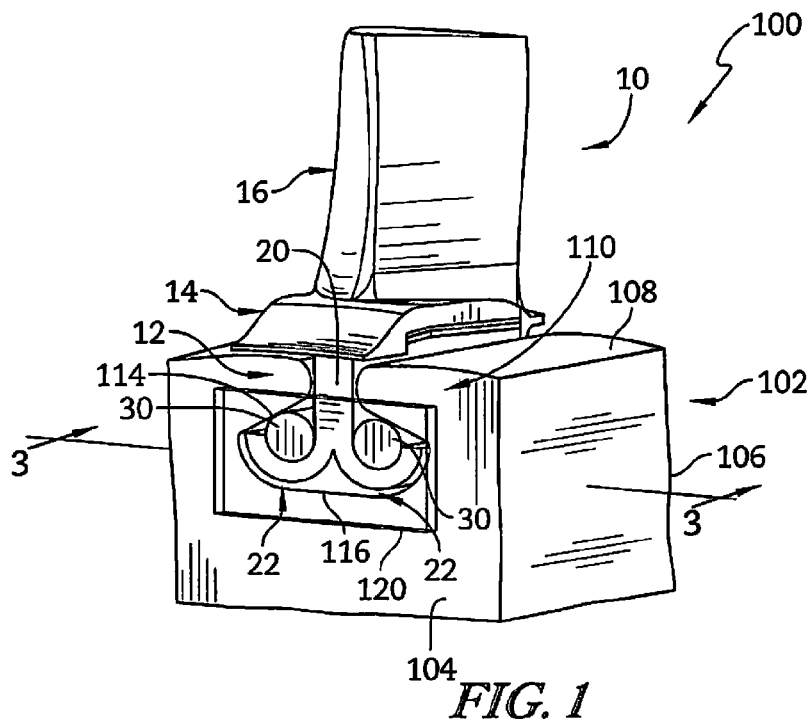
FIG. 1 is a partial perspective view of a turbine wheel adapted for use in a gas turbine engine showing that the turbine wheel includes a blade, a rotor disk having a dovetail slot to receive a root of the blade, and retainer pins arranged to engage the root of the blade and retain the root within the dovetail slot.

For the purposes of promoting an understanding of the principles of the disclosure, reference will now be made to a number of illustrative embodiments illustrated in the drawings and specific language will be used to describe the same.

Figure 2:
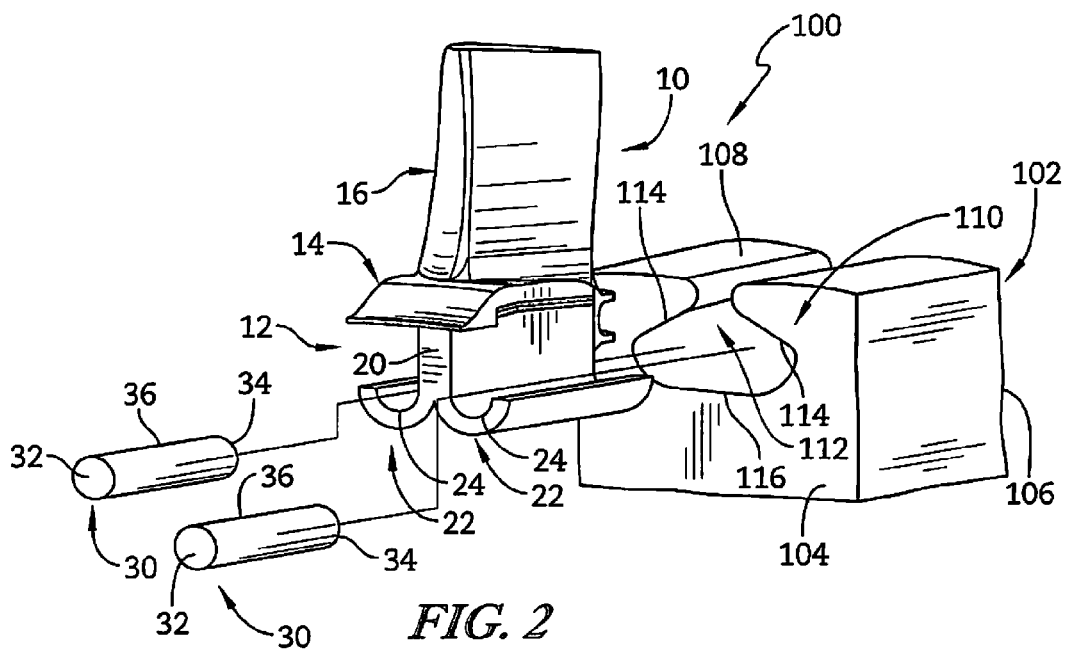
FIG. 2 is an exploded assembly view of the turbine wheel of FIG. 1 showing that the blade includes an airfoil, a platform, and the root for attaching the blade to rotor disk and suggesting that the root may incorporate material used to form the platform and airfoil as shown in FIG. 3.

An illustrative turbine wheel 100 adapted for use in a gas turbine engine is shown in FIGS. 1 and 2. The turbine wheel 100 includes a rotor disk 102 (only a portion of which is shown) and a plurality of turbine blades 10 (only one of which is shown). In accordance with the present disclosure, the turbine blades 10 are attached to the rotor disk 102 for rotation with the rotor disk 102 about a central axis of the gas turbine engine.

The rotor disk 102 is illustratively made from a metallic superalloy (e.g. Inconel, Waspalloy, etc.) and includes a forward side 104 facing toward a front of the gas turbine engine, an aft side 106 facing toward a rear of the engine, and a radial surface 108 defining an outer diameter of the rotor disk 102 as shown in FIGS. 1 and 2. The rotor disk 102 is additionally formed to include a plurality of dovetail slots 110 (only one of which is shown) formed in the rotor disk 102. In other embodiments, the rotor disk may be made from other metallic or non-metallic materials.

Each dovetail slot 110 extends inwardly in the radial direction from the radial surface 108 of the rotor disk 102 as shown in FIG. 2. Further, each dovetail slot 110 extends through the rotor disk 102 from the forward side 104 to the aft side 106 and is shaped to form a dovetail shape when viewed from the front or aft sides 104, 106. The dovetail slots 110 are positioned to couple the plurality of blades 10 to the rotor disk 102 to form the turbine wheel 100.

Cover plates 120 are coupled to the rotor disk 102 on the forward and aft sides of the dovetail slot 110 to assist in retaining the blade within the dovetail slot 110. The cover plates 120 may be attached by various methods including, but not limited to, welding or brazing, adhesives, or mechanical fasteners to name a few. The cover plates 120 prevent the root 12 and retention pins 30 from passing out of the dovetail slot 110 through the forward or aft sides of the dovetail slot 110 while the cover plate 120 is attached to the rotor disk 102.

Each blade 10 of the exemplary embodiment is made from a ceramic-matrix composite material adapted to withstand high temperature combustion products discharged onto the blade 10. The blades 10 illustratively comprise silicon-carbide reinforcements suspended in silicon-carbide matrix material. In other embodiments, other reinforcements and other ceramic-containing matrix materials may be included in the blades 10.

Each blade 10 is formed to include a root 12, a platform 14 coupled to the root 12, and an airfoil 16 coupled to the platform 14 as shown, for example, in FIG. 2. The platform 14 connects the root 12 to the airfoil 16 and separates the root 12 from the airfoil 16 so that gasses passing over the airfoil 16 are blocked from moving down around the root 12 as suggested in FIG. 1. The airfoil 16 is aerodynamically shaped to interact with gasses moving over the blade 10.

In the illustrative embodiment, the root 12 includes a stem 20 which extends down from the airfoil 16 and the platform 14 and a pair of pin receivers 22 extending circumferentially outward form the stem 20 as shown in FIG. 2. The stem 20 is sized to be received in a radially-facing opening 112 of the dovetail slot 110 such that the root 12 can pass into the dovetail slot 110 as shown in FIG. 1. Similarly, the pin receivers 22 are sized to be received in the dovetail slot 110. Each pin receiver 22 has an arcuate profile and defines a corresponding pin-receiving channel 24 sized to receive one of a pair of retention pins 30 as suggested in FIG. 2.

The retention pins 30 each have a forward end 32, an aft end 34, and a substantially cylindrical outer surface 36 as shown in FIG. 2. The retention pins 30 may be made from a metallic material and may comprise an alloy which may be cobalt-, nickel- or iron-based and may be alloyed with manganese, chromium, silicon, cobalt, tungsten, tantalum, aluminum, titanium, hafnium, rhenium, molybdenum, nickel, iron, boron, vanadium, carbon, and/or yttrium. In some embodiments the retention pins 30 may comprise a ceramic or composite material in place of a metal or metal alloy.

The pin-receiving channels 24 are sized to receive and engage the retention pins 30 as shown in FIG. 1. In the illustrative embodiment, the pin receivers 22 are semi-cylindrical forming a tube-half (or tube portion) having an inner radius substantially the same as a radius of the outer surface 36 of the retention pins 30.

The dovetail slot 110 of the rotor disk 102 illustratively includes a pair of converging angled surfaces 114 forming the radially-facing opening 112 and a rounded inner surface 116 connecting the angled surfaces 114 as shown in FIG. 2. The angled surfaces 114 extend radially outward from the rounded inner surface 116 and toward one another. The angled surfaces 114 are positioned to engage the retention pins 30 to retain the root 12 of the blade 10 within the slot 110 as suggested in FIG. 1. The rounded inner surface 116 is sized and shaped to surround the pin receivers 22. The rounded inner surface 116 may substantially match the outer profile of the pin receivers 22 in order to assist in retaining the root 12 within the slot 110.

In the illustrative embodiment, the root 12 passes into the dovetail slot 110 of the rotor disk 102 through either the forward or aft end of the dovetail slot 110 as suggested in FIG. 2. The retention pins 30 pass into the dovetail slot 110 between the pin receivers 22 of the root 12 and angled surfaces 114 of the dovetail slot 110 to be received in the pin-receiving channels 24. The cover plates 120 are attached to the rotor disk 102 to cover the open ends of the dovetail slot 110 and block removal of the blades 10 from the dovetail slots 110.

Figure 3:
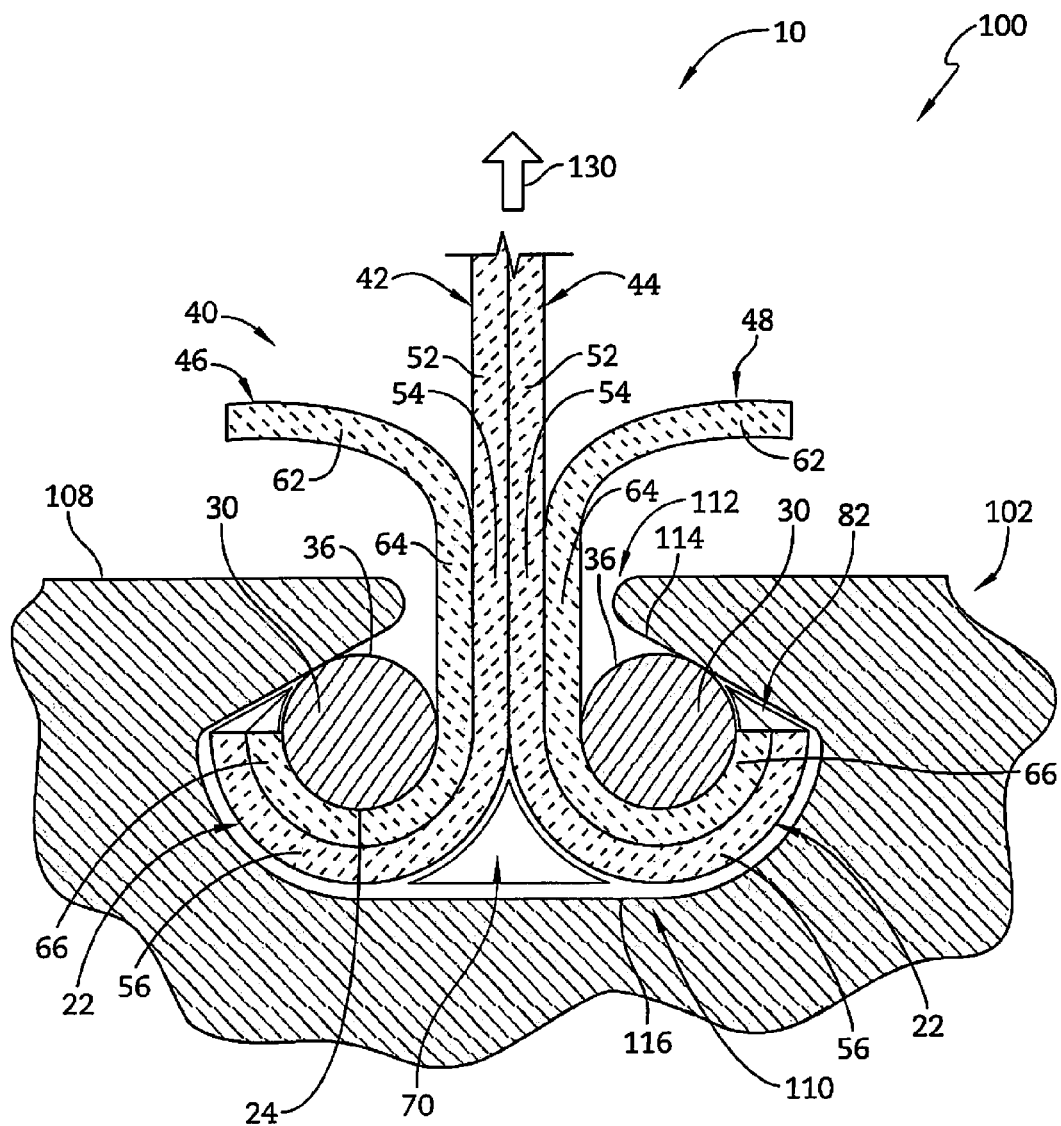
FIG. 3 is a cross-sectional view of the turbine wheel of FIG. 1 showing that one or more plies of ceramic-containing materials extend down from the platform and airfoil and outward from a central axis of the blade to form pin receivers for the pins mate with to retain the blade within the dovetail slot.

The retention pins 30 contact the pin receivers 22 and angled surfaces 114 of the dovetail slot 110 to counteract centrifugal forces 130 exerted on the blade 10 during operation of the gas turbine engine as suggested in FIG. 3. In one illustrative embodiment, the blade 10 is formed from a plurality of plies of ceramic-containing material bonded together with a ceramic matrix material in a composite structure. For example, each ply contains fibers of ceramic material woven together or otherwise arranged to form a sheet.

The plies may be flexible prior to forming the composite structure so that they can be arranged in a mold defining the general shape of the blade 10 and bonded together with the ceramic matrix material. The bonding process fixes the shape of the plies to form the composite structure. Subsequent machining or processing may occur to refine the shape of the composite structure.

In the illustrative embodiment, four plies 42, 44, 46, 48 are bonded together to form a composite structure 40 as suggested in FIG. 3. Although four plies are shown, more or less plies may be used without departing from the teachings of the present disclosure. For example, each ply shown and described may be a sub laminate combined with any number of plies for forming the composite structure of the blade. A first ply 42 is coupled to a second ply 44. Each of the first and second plies 42, 44 includes an airfoil portion 52 forming at least part of the airfoil of the blade 10, a stem portion 54 forming at least part of the stem 20 of the root 12, and a pin receiver portion 56 forming at least part of the pin receivers 22.

The airfoil portions 52 and stem portions 54 of the first and second plies 42, 44 extend along one another together while the pin receiver portions 56 of the first and second plies 42, 44 extend away from one another as suggested in FIG. 3. In the exemplary embodiment, each of the first and second plies 42, 44 is formed as a single, continuous sheet of material, and the fibers of ceramic reinforcement material forming the sheet are woven, braided, or otherwise intermingled with each other.

A third ply 46 is coupled to the first ply 42 and a fourth ply 48 is coupled to the second ply 44 as suggested in FIG. 3. The third and fourth plies 46, 48 each include a platform portion 62 forming at least part of the platform 14 of the blade 10, a stem portion 64 forming at least part of the stem 20, and a pin receiver portion 66 forming at least part of the pin receivers 22. In the illustrative embodiment, each of the first and second plies 42, 44 is formed as a single, continuous sheet of material, and the fibers of ceramic reinforcement material forming the sheet are woven, braided, or otherwise intermingled with each other.

The stem portion 64 and pin receiver portion 66 of the third ply 46 extends along the stem portion 54 and pin receiver portion 56 of the first ply 42 as suggested in FIG. 3. Similarly, the stem portion 64 and pin receiver portion 66 of the fourth ply 48 extends along the stem portion 54 and pin receiver portion 56 of the second ply 44. However, the platform portions 62 of the third and fourth plies 46, 48 extend away from one another and extend away from the first and second plies 42, 44.

In the illustrative embodiment, the stem portions 54, 64 of the plies 42, 44, 46, 48 are bonded together to form the stem 20 of the blade 10 as suggested in FIG. 3. The first and third plies 42, 46 are bonded together to form one of the pin receivers 22 while the second and fourth plies 44, 48 are bonded together to form the other pin receiver 22. An optional filler wedge 70 may be added between the pin receivers 22 to provide lateral support. In one embodiment, the wedge 70 is formed from chopped or segmented fibers of ceramic material suspended in a ceramic matrix material.

The blade 10 experiences centrifugal loading during rotation of the turbine wheel 100 as suggested by arrow 130 in FIG. 3. The forces are distributed through the stem 20 and to the pin receivers 22. The outer surface 36 of the retention pins 30 contacts the angled surface 114 of the dovetail slot 110, the pin receivers 22 of the blade 10, and at least a portion of the stem 20 to resist the forces acting on the blade 10 and maintain positioning of the root 12 within the dovetail slot 110.

The angled surfaces 114 of the dovetail slot 110 provide a radially inward resistance force to counteract the radially outward centrifugal load placed on the blade 10 as suggested in FIG. 3. The resistance force is transferred through the retention pins 30 to the pin receivers 22 to hold the blade 10 to the rotor disk 102. The angled surfaces 114 also force the retention pins 30 toward one another placing the stem 20 in compression and providing tangential alignment of the blade 10.

In the illustrative embodiment, the pin receivers 22 are not in contact with the dovetail slot 110 as shown in FIG. 3. However, in other embodiments the pin receivers 22 may be in contact with portions of the dovetail slot 110. For example, the pin receivers 22 may be formed to include a beveled wrapper portion 82 where the plies 42, 44, 46, 48 partially wrap around the retention pins 30 and match the profile of the angled surfaces 114 of the dovetail slot 110.

In another embodiment, the retention pins 30 are not cylindrical. For example, the retention pins may have a cam shaped profile including a round portion to contact the pin receivers 22 and a lobe portion to contact the stem 20 and angled surfaces 114. However, other profiles are possible without departing from the teachings of the present disclosure.

One method of assembling a turbine wheel 100 as described herein includes passing the root 12 into the dovetail slot 110 of the rotor disk 102 through either the forward or aft end of the dovetail slot 110 and passing the retention pins 30 into the dovetail slot 110 between the pin receivers 22 of the root 12 and angled surfaces 114 of the dovetail slot 110 to be received in the pin-receiving channels 24 as suggested in FIGS. 1 and 2. The method may further include attaching the cover plates 120 to the rotor disk 102 to cover the open ends of the dovetail slot 110 and block removal of the blades 10 from the dovetail slots 110.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel for a gas turbine engine, the turbine wheel comprising
    a disk formed to include a dovetail slot that extends through the disk in an axial direction from a forward side to an aft side of the disk and inwardly in a radial direction from an outer diameter of the disk toward a central axis,
    a blade comprising ceramic-containing materials, the blade formed to include an airfoil that extends outwardly in the radial direction from the outer diameter of the disk and a root that extends into the dovetail slot, the root including a stem that extends from the airfoil into the dovetail slot and a pair of pin receivers arranged in the dovetail slot that extend circumferentially from the stem in opposing directions, wherein the blade includes a first and a second composite ply and each of the first and the second composite plies include a receiver portion that extends circumferentially away from the stem portion to provide at least part of a pin receiver and an airfoil portion that extends radially outwardly from the root to provide at least part of the airfoil, and
    a pair of retention pins each arranged in the pin receivers, the pair of retention pins are arranged on circumferentially opposed sides of the stem and are arranged radially between the pin receivers and the disc so that centrifugal forces applied to the blade when the turbine wheel is rotated about the central axis are transferred through the pair of retention pins to the disk.

2. The turbine wheel of claim 1, wherein each pin receiver defines a pin-receiving channel sized to receive one of the pair of retention pins and arranged to open outwardly in the radial direction.

3. The turbine wheel of claim 2, wherein each retention pin is cylindrical and each pin-receiving channel is arcuate and has the same diameter as the retention pins.

4. The turbine wheel of claim 2, wherein each retention pin is at least partially non-cylindrical including a portion for engaging the pin-receiving channel and a portion for engaging the disc.

5. The turbine wheel of claim 1, wherein each of the first and the second composite plies include a stem portion that extends inwardly in the radial direction from the airfoil to provide at least part of the stem.

6. The turbine wheel of claim 5, wherein the blade is formed to include a platform arranged radially outward of the dovetail slot that extends circumferentially in both directions away from the airfoil, the blade includes a third and a fourth composite ply, and each of the third and the fourth plies include a platform portion that extends circumferentially from the airfoil to provide at least part of the platform, a stem portion that extends inwardly in the radial direction from the platform to provide at least part of the stem, and a receiver portion that extends circumferentially away from the stem portion to provide at least part of a pin receiver.

7. The turbine wheel of claim 1, wherein the blade comprises ceramic reinforcements suspended in a ceramic-matrix material.

8. The turbine wheel of claim 7, wherein the ceramic reinforcement include silicon-carbide and the ceramic-matrix material includes silicon-carbide.

9. A composite blade for a gas turbine engine, the composite blade comprising
    an airfoil comprising ceramic-matrix material and configured to interact with gasses during rotation of the airfoil about an axis, and
    a root comprising ceramic-matrix material, the root including a stem that extends from the airfoil and a pair of pin receivers that extend in two generally opposed directions from the stem and that define pin-receiving channels on opposed sides of the stem that open to face toward the airfoil,
    wherein the blade is formed from a first and a second composite ply and each of the first and the second composite plies include a receiver portion that extends circumferentially away from the stem portion to provide at least part of a pin receiver and an airfoil portion that extends radially outwardly from the root to provide at least part of the airfoil.

10. The composite blade of claim 9, wherein each pin-receiving channel is arcuate.

11. The composite blade of claim 9, wherein each of the first and the second composite plies include a stem portion that extends from the airfoil to provide at least part of the stem.

12. The composite blade of claim 11, wherein the blade is formed to include a platform arranged between the pair of pin retainers and the airfoil that extends in two generally opposed directions away from the airfoil; the blade includes a third and a fourth composite ply; and each of the third and the fourth plies include a platform portion that extends in two generally opposed directions from the airfoil to provide at least part of the platform, a stem portion that extends from the platform portion to provide at least part of the stem, and a receiver portion that extends from the stem portion to provide at least part of a pin receiver.

13. The composite blade of claim 9, wherein the blade comprises ceramic reinforcements suspended in the ceramic-matrix material.

14. The composite blade of claim 13, wherein the blade includes a third ply of ceramic reinforcements coupled to the first ply, and a fourth ply of ceramic reinforcements coupled to the second ply, the first, second, third, and fourth plies being bonded together with the ceramic-matrix material to form a composite structure having a platform portion formed by the third and fourth plies, a stem portion formed by the first, second, third, and fourth plies, a first pin receiver portion formed by the first and third plies, and a second pin receiver portion formed by the second and fourth plies.

15. A composite blade for a gas turbine engine, the composite blade comprising
an airfoil comprising ceramic-matrix material,
a root comprising ceramic-matrix material, the root including a stem that extends from the airfoil and a pair of pin receivers that extend in two generally opposed directions from the stem and that define pin-receiving channels on opposed sides of the stem that open to face toward the airfoil, and
a plurality of segmented ceramic reinforcements suspended in a ceramic-matrix material, the segmented ceramic reinforcements and ceramic-matrix material being positioned between the pin receivers and adapted to support lateral loading of the pin receivers.

16. A method of assembling a turbine wheel, the method comprising
positioning a root of a composite blade in a dovetail slot of a rotor disk, the root including a stem that extends from an airfoil of composite blade and a pair of pin receivers that extend in two generally opposed directions from the stem and that define pin-receiving channels on opposed sides of the stem, wherein the pin-receiving channels are shaped so as to open to face toward the airfoil, wherein the blade is formed from a first and a second composite ply and each of the first and the second composite plies include a receiver portion that extends circumferentially away from the stem portion to provide at least part of a pin receiver and an airfoil portion that extends radially outwardly from the root to provide at least part of the airfoil, and
positioning a retention pin in each pin-receiving channel such that the pins contact the pin-receiving channel and the dovetail slot of the rotor disk to maintain positioning of the root within the dovetail slot.

17. The method of claim 16, further including securing the root within the dovetail slot.

18. The method of claim 17, wherein securing the root within the dovetail slot includes forcing the pin receivers against the dovetail slot with the retention pins and forcing the retention pins toward one another such that the pin receivers and the stem are in compression.

* * * * *